(12) United States Patent
Steinkraus et al.

(10) Patent No.: US 11,363,801 B1
(45) Date of Patent: Jun. 21, 2022

(54) PET FEEDER/PUZZLE BALL WITH SELECTABLE NUMBER OF DISPENSING OPENINGS TO VARY DISPENSING RATES

(71) Applicant: Gramercy Products, Inc., Secaucus, NJ (US)

(72) Inventors: William Steinkraus, Fort Lee, NJ (US); Daniel Troiano, Secaucus, NJ (US)

(73) Assignee: Gramercy Products, Inc., Secaucus, NJ (US)

( * ) Notice: Subject to any disclaimer, the term of this patent is extended or adjusted under 35 U.S.C. 154(b) by 83 days.

(21) Appl. No.: 16/904,770

(22) Filed: Jun. 18, 2020

Related U.S. Application Data

(60) Provisional application No. 62/863,374, filed on Jun. 19, 2019.

(51) Int. Cl.
  *A01K 15/02* (2006.01)
  *A01K 5/02* (2006.01)
  *A01K 5/01* (2006.01)

(52) U.S. Cl.
  CPC .......... *A01K 15/025* (2013.01); *A01K 5/0114* (2013.01)

(58) Field of Classification Search
  CPC ...... A01K 15/025; A01K 5/0114; A01K 5/01; A01K 15/026
  See application file for complete search history.

(56) References Cited

U.S. PATENT DOCUMENTS

| | | | |
|---|---|---|---|
| 2,086,631 | A | 7/1937 | Munro |
| 5,213,232 | A | 5/1993 | Kraft |
| 5,377,620 | A | 1/1995 | Phillippi |

(Continued)

FOREIGN PATENT DOCUMENTS

| | | |
|---|---|---|
| CA | 2731238 | 1/2010 |
| DE | 29821473 | 4/1999 |

(Continued)

OTHER PUBLICATIONS

Press Fit Forces Stress Design Calculator, Jun. 18, 2018, available at: www.engineersedge.com/calculators/machine-design/press-fit/press-fit.htm.

(Continued)

*Primary Examiner* — Trinh T Nguyen
(74) *Attorney, Agent, or Firm* — Thomas A. O'Rourke; Bodner & O'Rourke, LLP

(57) ABSTRACT

A pet puzzle feeder includes: a housing; a treat chamber, a portion of which is rotatably received in a cavity of the housing; and an access cover. The housing has a pattern of openings on a spherical surface that define recesses that extend to a first radial depth and do not reach the cavity. A portion of those housing openings, being in three different regions of the housing, define conduits that extend to interconnect with the cavity. Different numbers or sizes of the opening on the three regions permit dispensing of treats at different rates, when the dispensing opening of the treat chamber is rotated/aligned therewith. A detent mechanism releasably inhibit treat chamber rotation when aligned with the openings in each region. A first color is used for the conduits, and a second color for the recesses, as a visual cue for the pet.

8 Claims, 13 Drawing Sheets
(8 of 13 Drawing Sheet(s) Filed in Color)

(56) References Cited

U.S. PATENT DOCUMENTS

| | | |
|---|---|---|
| 5,758,604 A | 6/1998 | Jorgensen |
| 5,819,690 A | 10/1998 | Brown |
| 5,832,877 A | 11/1998 | Markham |
| 5,865,147 A | 2/1999 | Rubin |
| 5,957,082 A | 9/1999 | Budman |
| 6,073,581 A | 6/2000 | Wang |
| 6,098,571 A | 8/2000 | Axelrod |
| 6,158,391 A | 12/2000 | Simonetti |
| 6,237,538 B1 | 5/2001 | Tsengas |
| 6,349,671 B1 | 2/2002 | Lewis |
| 6,557,496 B2 | 5/2003 | Herrenbruck |
| 6,688,258 B1 | 2/2004 | Kolesar |
| 6,945,195 B1 | 9/2005 | Morrison |
| 7,270,085 B2 | 9/2007 | Wolfe |
| 7,278,374 B2 | 10/2007 | Mann |
| 7,389,748 B2 | 6/2008 | Shatoff |
| 7,536,978 B2 | 5/2009 | Washington |
| 7,555,997 B2 | 7/2009 | Wolfe |
| 7,600,488 B2 | 10/2009 | Mann |
| 7,631,613 B2 | 12/2009 | Lescroart |
| 7,640,894 B2 | 1/2010 | Jager |
| 7,650,855 B2 | 1/2010 | Krishnamurthy |
| 8,225,747 B2 | 7/2012 | Markham |
| 8,474,404 B2 | 7/2013 | Costello |
| 8,746,182 B2 | 6/2014 | Anderson |
| 8,820,268 B2 | 9/2014 | Valle |
| 8,997,689 B2 | 4/2015 | Ragonetti |
| 9,596,829 B2 * | 3/2017 | Wolfe, Jr .............. A01K 15/025 |
| 9,596,831 B2 | 3/2017 | Christensen |
| D793,630 S | 8/2017 | Bales |
| 9,832,976 B2 | 12/2017 | Dewey |
| 9,901,075 B2 | 2/2018 | Wolfe |
| 9,961,880 B2 | 5/2018 | Simon |
| D819,748 S | 6/2018 | Luk |
| D821,661 S | 6/2018 | Burchman |
| 10,149,457 B2 | 12/2018 | Vance |
| 10,888,068 B2 * | 1/2021 | Yang ..................... A01K 15/026 |
| 10,959,406 B2 * | 3/2021 | Campbell .............. A01K 15/02 |
| 2005/0224003 A1 | 10/2005 | Yin |
| 2008/0083378 A1 | 4/2008 | Pearce |
| 2008/0121190 A1 | 5/2008 | Moulton |
| 2009/0314221 A1 | 12/2009 | Wang |
| 2011/0139815 A1 | 6/2011 | Benson |
| 2011/0226187 A1 | 9/2011 | Bertsch |
| 2012/0298044 A1 | 11/2012 | Dotterer |
| 2012/0318210 A1 * | 12/2012 | Anderson ............ A01K 15/025 119/710 |
| 2013/0019812 A1 * | 1/2013 | Rutherford .......... A01K 15/025 119/710 |
| 2013/0055965 A1 * | 3/2013 | Valle ..................... A01K 15/025 119/710 |
| 2014/0261194 A1 * | 9/2014 | Cloutier ............... A01K 15/025 119/51.01 |
| 2014/0373788 A1 * | 12/2014 | Ragonetti ............ A01K 15/025 119/51.01 |
| 2015/0342145 A1 * | 12/2015 | Christianson ........... H04W 4/80 119/51.01 |
| 2016/0278342 A1 * | 9/2016 | Wolfe, Jr ............. A01K 5/0114 |
| 2016/0316719 A1 * | 11/2016 | Parness ................ A01K 15/025 |
| 2019/0098864 A1 * | 4/2019 | Simon .................. A01K 5/0135 |
| 2019/0261601 A1 * | 8/2019 | Stone ...................... A01K 5/02 |

FOREIGN PATENT DOCUMENTS

| | | |
|---|---|---|
| EP | 2870871 | 5/2015 |
| GB | 2492110 | 12/2012 |
| JP | 4413962 | 6/2009 |
| KR | 101914213 | 11/2018 |

OTHER PUBLICATIONS

"Three General Types of Fit," available at www.mmto.org/dclark/Reports/Encoder%20Upgrade/fittolerences%20%5BRead-Only%5D.pdf., Jul. 8, 2019.

"Engineering Fit," available at: https://en.wikipedia.org/wiki/Engineering_fit, Jul. 8, 2019.

* cited by examiner

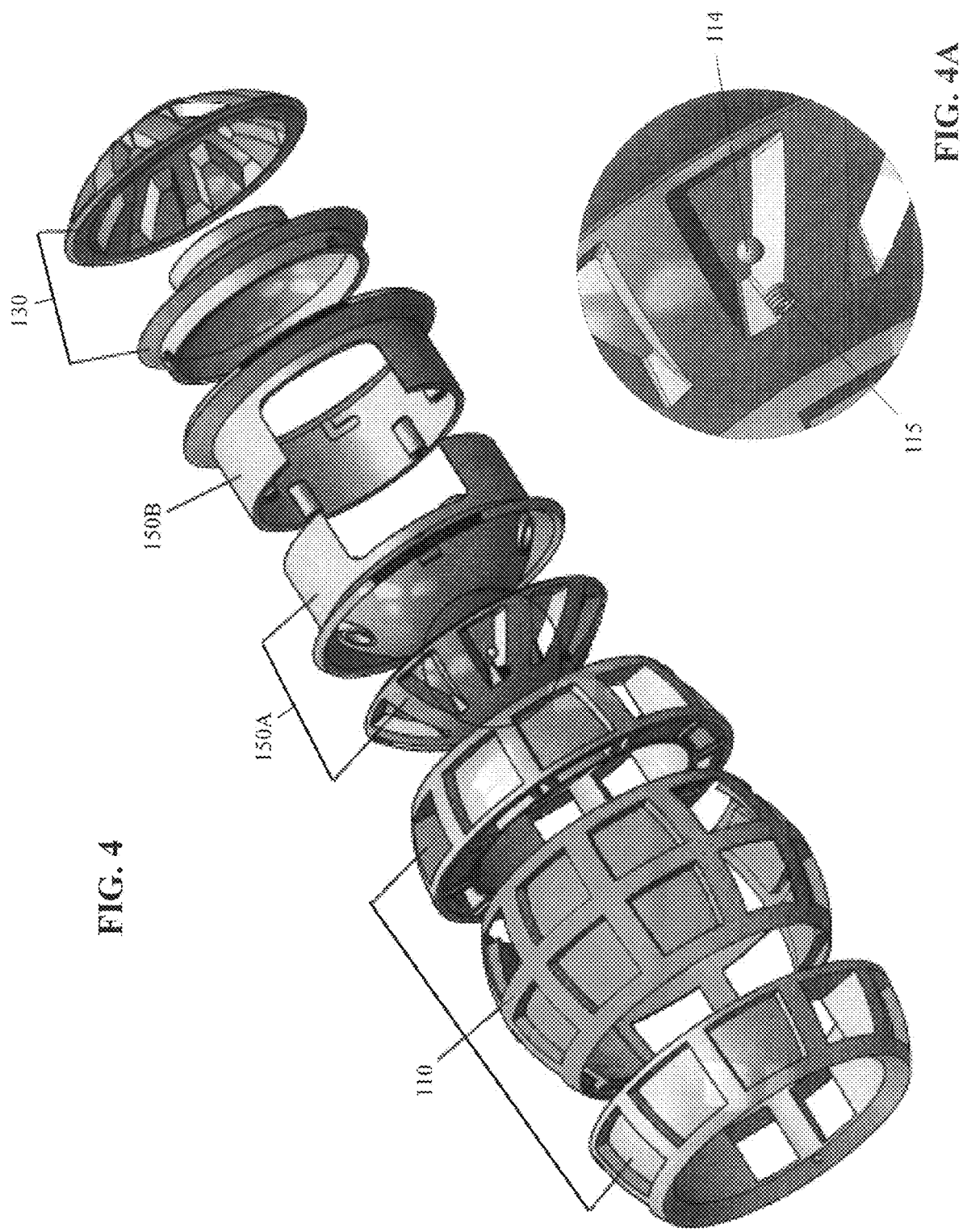

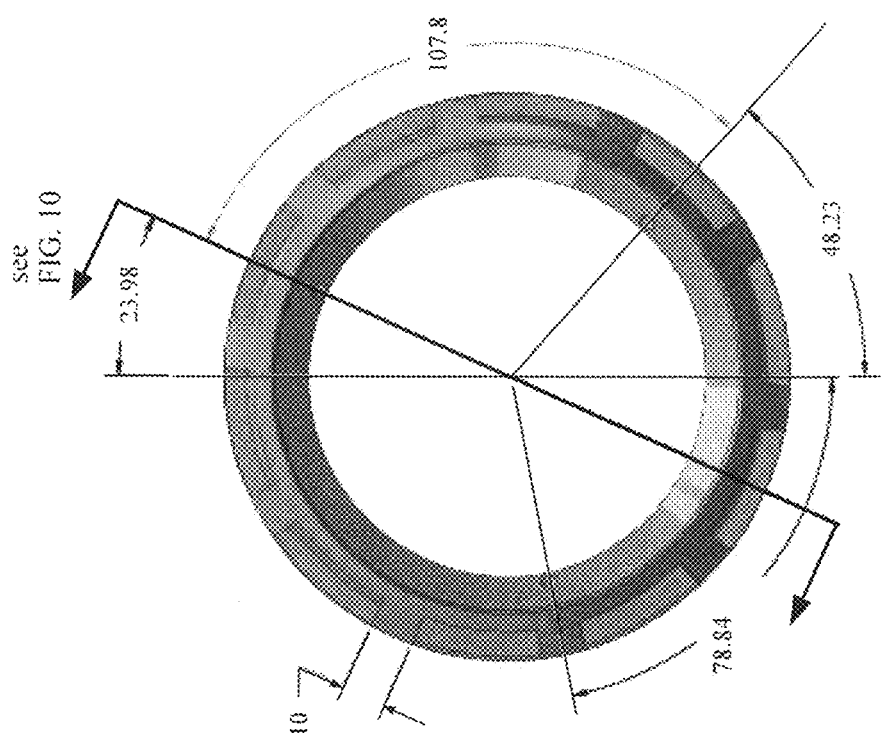

150B

150A
Ball Bearing Hole
Hole Locator Bumps

PET FEEDER/PUZZLE BALL WITH SELECTABLE NUMBER OF DISPENSING OPENINGS TO VARY DISPENSING RATES

CROSS REFERENCES TO RELATED APPLICATIONS

This application claims priority on U.S. Provisional Application Ser. No. 62/863,374, filed on Jun. 19, 2019, the disclosures of which are incorporated herein by reference.

FIELD OF THE INVENTION

This disclosure relates generally to pet feeding devices, and more particularly to a feeding device that overall forms a spherical shape for rolling by the pet on the ground, for dispensing of treats, when rolled by the pet in a particular direction, through at least one opening that is connected to a treat reservoir, and which opening (and direction) must be discerned by the pet from among additional non-dispensing recesses that may be colored differently to maximize the number of pet treats released by the device by such activity.

BACKGROUND OF THE INVENTION

The typical indoor pet tends to become lethargic and often does not undergo sufficient exercise until brought outdoors, which usually does not even occur for certain animals like cats. For that reason there are numerous toys on the market intended to entertain and cause the pet to be more active while trying to track and catch a moving object. In addition, most indoor pets are more content when challenged and provided with an intellectually stimulating activity.

Moreover, most pets also tend to become more excited about an activity that involves obtaining a snack or treat. For that reason a number of inventions have been devised that relate to encouraging activity while dispensing such pet treats.

Devices/methods that may be related, and which are not admitted herein to be prior art with respect to the disclosed apparatus, may be shown by the following.

U.S. Pat. No. 2,086,631 to Munro is for a toy in the form of a spherical body with a cavity to store catnip or other herbs, and a duct for dispensing the catnip to a surface of the toy, as well as a closure means for closing the duct.

U.S. Pat. No. 5,819,960 to Brown is for a treat-dispensing ball (i.e., a roll toy) that has a hollow body with at least two elongated openings, and is filled with animal treats that are randomly discharged from the openings as the toy is rolled.

U.S. Pat. No. 6,237,538 to Tsengas is for a pet toy ball feeder that is formed using two hollow hemispherical halves, which may be releasably joined together to permit storing of pet treats therein. The pet treats are dispensed through one or more openings that are slightly larger than the pet treats for random dropping of the treats through the one or more openings.

U.S. Pat. No. 6,557,496 to Herrenbruck is for an improved treat dispensing toy that provides multiple levels of stimulation, including audio stimulation (selectively produced noise) and reward stimulation. The toy may be in the shape of a ball that has an exit that allows treats to be dispensed when the toy is manipulated by a pet.

U.S. Pat. No. 7,640,894 to Jager is for a rubber chew toy in the form of a ball with a hollow interior and at least one aperture in communication with helical insert that operates based on the principles of an Archimedes screw to dispense pet treats.

U.S. Pat. No. 8,746,182 to Anderson is for a treat dispenser that includes a container surrounded by a cage, where the container has an opening for dispensing treats that may not immediately be obtained by the pet as the cage prevents direct access.

U.S. Patent Application Pub. No. 2008/0083378 is for a pet exercise toy formed with two nested cylindrical housings having capped ends that can be filled with treats. The treats can be dispensed through an opening in the outer housing when it is rotated to be aligned with either a small opening in the inner housing or a larger opening in the inner housing.

U.S. Patent Application Pub. No. 2009/0314221 by Wang is for a toy for dispensing pet treats in the form of a cylindrical housing having a large opening therein that may be aligned with either a correspondingly sized first opening in a second inner housing, or that may be aligned with a second smaller opening in the inner housing to dispense treats at one of two different rates.

Japanese patent publication JP4413962 describes a spherical puzzle feeder for a pet that has an internal storage chamber with an inner feed opening that may be fully covered, or partially covered, or completely uncovered by selective alignment with an opening in an internal adjusting plate. Alignment of those openings permits treat to exit the chamber, which treat may then exit an opening in the outer spherical periphery of the "Educational Toys for Animals."

The herein disclosed apparatus offers improvements upon similar pet treat dispensing devices.

OBJECTS OF THE INVENTION

It is an object of the invention to provide a spherically shaped pet food dispensing toy.

It is another object of the invention to provide a spherically shaped pet food dispenser that is particularly configured to roll uniformly without such rolling motion being distorted/disturbed by one or more openings located in the outer surface of the sphere that are used for dispensing treats.

It is a further object of the invention to provide a spherically shaped pet food dispenser that has an inner treat holder with a chamber and an opening, which holder may be rotated to be aligned with a plurality of particularly shaped openings in an outer housing to dispense treats at either a first rate or a second rate.

It is another object of the invention to provide a spherically shaped pet food dispenser that has an inner housing and an outer housing that may be rotated relative to each other to align different opening to dispense at different rates, where the inner housing and the outer housing may be releasably secured using a detent mechanism when the openings are aligned.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A puzzle pet feeder as disclosed herein may broadly include: a particularly formed housing, a rotatable treat chamber, and an access cover. In one embodiment the housing may be formed as a spherical cap, and in another embodiment it may be formed as a spherical frustum.

The housing may be formed into a spherical lattice by being formed with a pattern/plurality of openings in the spherical outer surface of the housing that define a plurality of recesses, with each recess formed to extend to at least a first radial depth. A cavity is formed within a portion of the housing, the cavity being formed beneath a second radial depth, where the second radial depth is greater than the first radial depth. An access opening in a boundary surface of the spherical cap/frustum of the housing (e.g., a planar surface of the spherical cap) defines a conduit into the cavity. The housing also has a first one of the plurality of openings being formed in a first region of the spherical housing lattice that that defines a conduit that extends to the second depth to interconnect with the cavity. The surface area (and shape) of the first opening used on the spherical surface determines the size of the pet treat that may be dispensed through the conduit and out the opening. The shape may be circular, or may be close to a square, being somewhat trapezoidal due to curvature. A second and a third of the plurality of openings are formed in a second region of the spherical housing lattice and with a respective second surface area and third surface area that each form corresponding conduits that extend to the second depth to interconnect with the cavity, the second surface area and the third surface area in combination being greater than the first surface area. (i.e., being approximate twice as large when each of the surface areas are substantially the same) A fourth, fifth, sixth, and seventh of the plurality of openings are formed in a third region of the spherical housing lattice and with a respective fourth surface area, fifth surface area, sixth surface area, and seventh surface area that each form corresponding conduits that extend to the second depth to interconnect with the cavity, the fourth, fifth, sixth, and seventh surface areas in combination being greater than the second and third surface areas combined (i.e., being approximate twice as large when each of the surface areas are substantially the same).

The treat chamber is configured to store pet treats, and includes: a dispensing opening for the dispensing of the pet treats stored therein. At least a portion of the treat chamber is rotatably received within the cavity of the housing.

A removable cover member is configured to cover the access opening into the housing cavity, and an outer surface of the removable cover member may be formed as a spherical cap, such that the spherical cap of the removable cover member and the spherical cap of the housing form a substantially full spherical shape; where the housing is formed as a spherical frustum, the treat chamber may include a portion formed as a spherical cap, such that the spherical cap of the cover member, the spherical frustum of the housing, and the spherical cap of the treat chamber together form a substantially spherical surface (i.e., substantially spherical apart from small clearances between the members that may leave gaps in the spherical surface). The spherical cap of the cover member and the spherical cap of the treat member may each be formed with a plurality of openings in the spherical outer surface defining recesses formed to extend to a radial depth being no greater than the first radial depth.

The rotatable treat chamber is rotatable between: a first position where the dispensing opening is substantially aligned with the first opening to permit dispensing of the pet treats at a first rate; a second position where the dispensing opening is substantially aligned with the second and third openings, to permit dispensing of the pet treats at a second rate, the second rate being greater than the first rate; a third position where the dispensing opening is substantially aligned with the fourth, fifth, sixth, and seventh openings, to permit dispensing of the pet treats at a third rate, the third rate being greater than the second rate; and at least a fourth position where the dispensing opening is not aligned with any of the first, second, third, fourth, fifth, sixth, and seventh openings, to prevent the dispensing of treats. (Note, the dispensing opening of the rotatable treat chamber may occupy three positions at which it is not aligned with any of the conduits, being positioned between first opening in the first regions, and the second and third openings in the second region; or being positioned between the second and third openings in the second region, and the fourth thru seventh openings in the third region; or being positioned between the first opening in the first region and the fourth thru seventh openings in the third region.

A detent mechanism (e.g., a ball, spring, and recess) is configured to releasably inhibit the rotation of the treat chamber with respect to the housing when the dispensing opening is aligned with the openings in the first region, and when aligned with the openings in the second region, and when aligned with the opening in the third region.

The openings in each of the first region, the second region, and the third region may be spaced apart about 120 degrees on the spherical outer surface. The periphery of the surface area for each of the openings may in the spherical frustum may be a plurality of equally spaced pairs of openings, with each pair being a symmetrical trapezoidal shaped periphery. To form part of the puzzle to be figured out by the pet, the outer surface of the housing and/or the openings defining the recesses and conduits in the spherical frustum may be a first color, and the pet treat chamber and/or housing cavity may be a second color, so the pet can distinguish the first and second colors to identify the conduits with the second color as being configured to permit dispensing of the treats from the pet feeder.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The description of the various example embodiments is explained in conjunction with appended drawings, in which:

FIG. 4 is an exploded perspective view of a series of parts that may be assembled to form the spherical pet feeder embodiment of FIG. 1;

FIG. 4A is an enlarged detail view showing the spring and ball used to engage any one of a plurality of recesses in the housing shown in FIG. 4 to form a detent mechanism;

FIG. 7A is the bottom view of FIG. 7 shown enlarged;

DETAILED DESCRIPTION OF THE INVENTION

Figure 1:
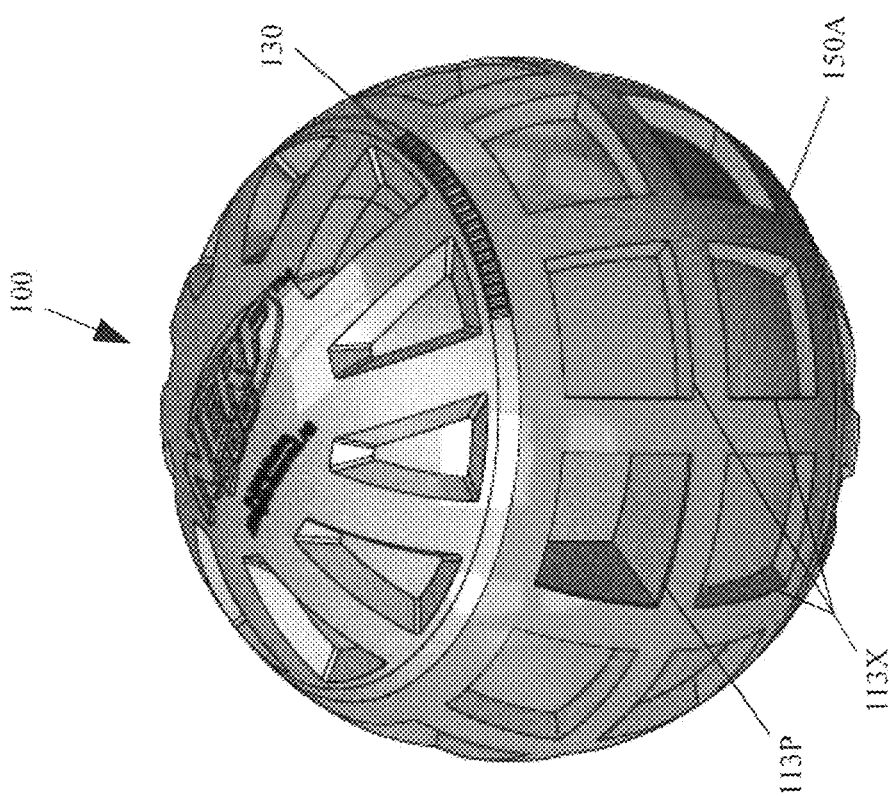
FIG. 1 is a first perspective view of a first spherical pet feeder embodiment, showing a first opening at a first latitudinal position, and two pairs of adjacent openings at second and third latitudinal positions.

As used throughout this specification, the word "may" is used in a permissive sense (i.e., meaning having the potential to), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, it is noted that citing herein of any patents, published patent applications, and non-patent literature is not an admission as to any of those references constituting prior art with respect to the disclosed and/or claimed apparatus/method.

Furthermore, any reference made throughout this specification to "one embodiment" or "an embodiment" means that a particular feature, structure or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value modified by a term such as "about" is not to be limited to the precise value specified, and may include values that differ from the specified value in accordance with applicable case law. Also, in at least some instances, a numerical difference provided by the approximating language may correspond to the precision of an instrument that may be used for measuring the value. A numerical difference provided by the approximating language may also correspond to a manufacturing tolerance associated with production of the aspect/feature being quantified. Furthermore, a numerical difference provided by the approximating language may also correspond to an overall tolerance for the aspect/feature that may be derived from variations resulting from a stack up (i.e., the sum) of a multiplicity of such individual tolerances.

Any use of a friction fit (i.e., an interface fit) between two mating parts described herein indicates that the opening (e.g., a hole) is smaller than the part received therein (e.g., a shaft), which may be a slight interference in one embodiment in the range of 0.0001 inches to 0.0003 inches, or an interference of 0.0003 inches to 0.0007 inches in another embodiment, or an interference of 0.0007 inches to 0.0010 inches in yet another embodiment, or a combination of such ranges. Other values for the interference may also be used in different configurations (see e.g., "Press Fit Engineering and Design Calculator," available at: www.engineersedge.com/calculators/machine-design/press-fit/press-fit-calculator.htm).

Figure 2:
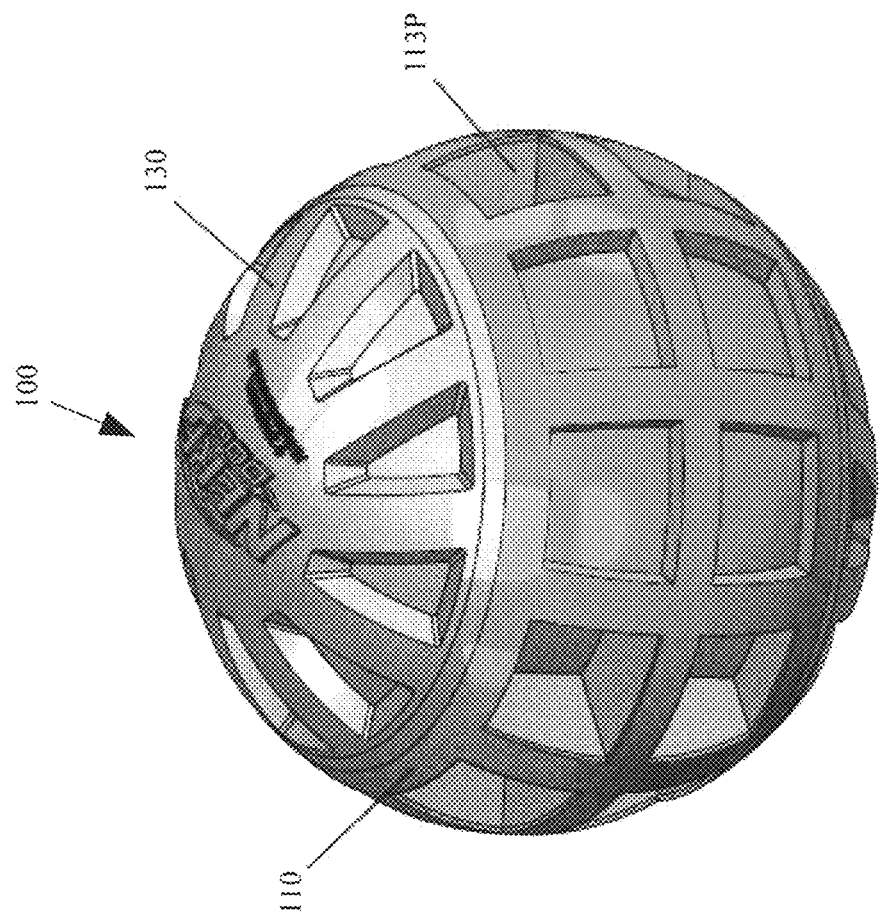
FIG. 2 is a second perspective view of the spherical pet feeder of FIG. 1, showing the first opening at the first latitudinal position, and also showing another pair of openings at a fourth latitudinal position.
Figure 3:
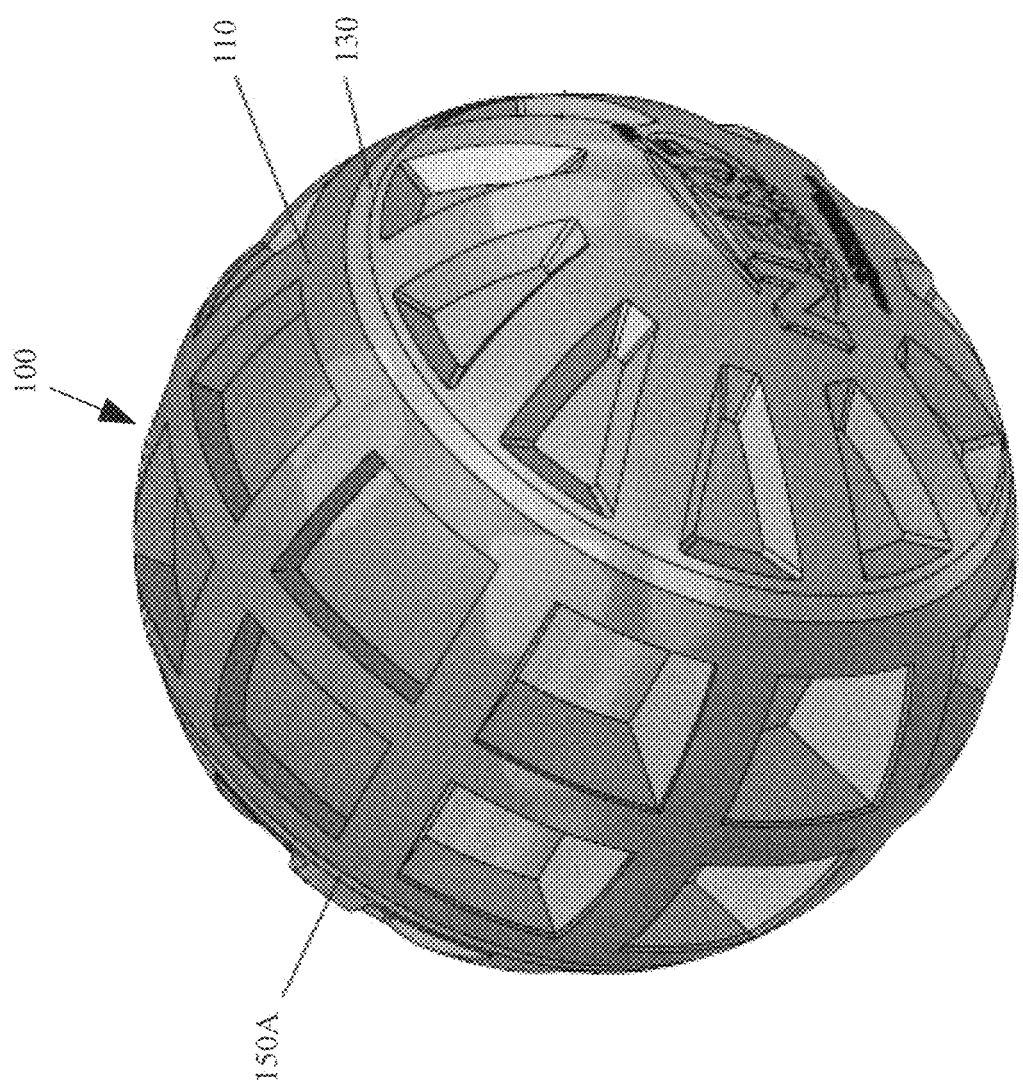
FIG. 3 is a third perspective view of the spherical pet feeder of FIG. 1, showing the two pairs of adjacent openings at the second and third latitudinal positions.

Any described use of a clearance fit indicates that the opening (e.g., a hole) is larger than the part received therein (e.g., a shaft), enabling the two parts to move (e.g. to slide and/or rotate) when assembled, where the gap between the opening and the part may depend upon the size of the part and the type of clearance fit—i.e., loose running, free running, easy running, close running, and sliding (e.g., for a 0.1250 inch shaft diameter the opening may be 0.1285 inches for a close running fit, and may be 0.1360 inches for a free running fit; for a 0.5000 inch diameter shaft the opening may be 0.5156 inches for a close running fit and may be 0.5312 inches for a free running fit). Other clearance amounts are used for other clearance types. See "Engineering Fit" at: https://en.wikipedia.org/wiki/Engineering_fit; and "Three General Types of Fit," available at www.mm-to.org/dclark/Reports/Encoder%20Upgrade/fittolerences%20%5BRead-Only%5D.pdf. Perspective views of one embodiment of a pet puzzle feeder are shown in FIGS. 1-3, and an exploded view of parts are shown in FIG. 4, some or all of which may be used to form various different embodiments of the herein disclosed pet puzzle feeder.

Figure 20D:
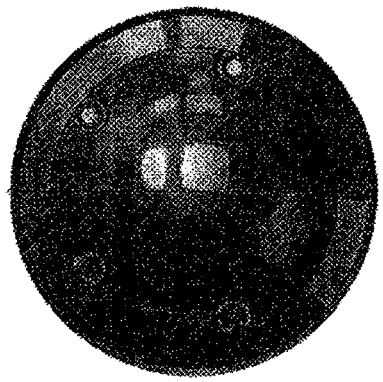
FIG. 20D is a top view of the assembled food chamber shown in FIG. 20A.
Figure 20A:
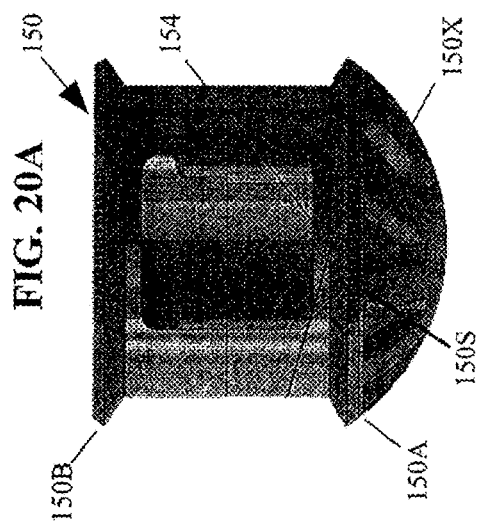
FIG. 20A is a front view showing the first portion of the food chamber seen in FIG. 12 after being joined to the second portion of the food chamber seen in FIG. 16.
Figure 22:
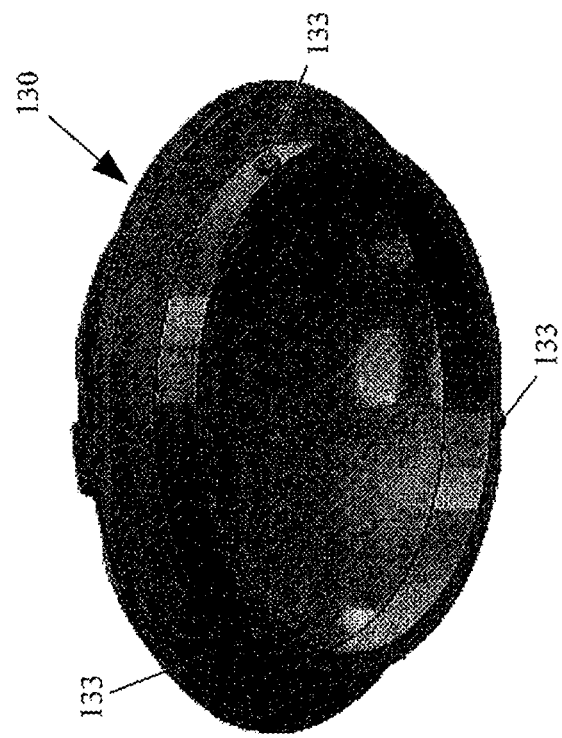
FIG. 22 is a second perspective view of the lid shown FIG. 21.

A first puzzle pet feeder embodiment 100 may include a housing 110 (FIGS. 5-9), a cap member 130 (FIGS. 21-22), and a treat holder 150 (FIG. 20A).

Figure 6:
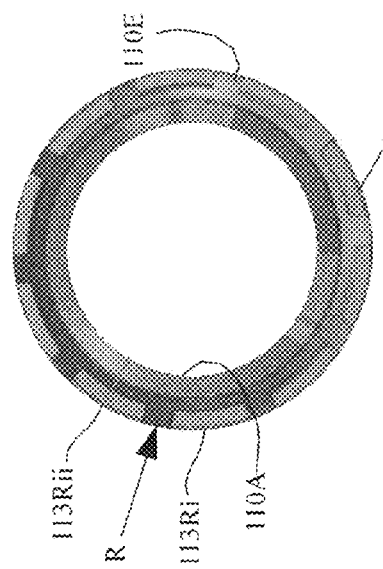
FIG. 6 is a top view of the housing of FIG. 5.
Figure 5:
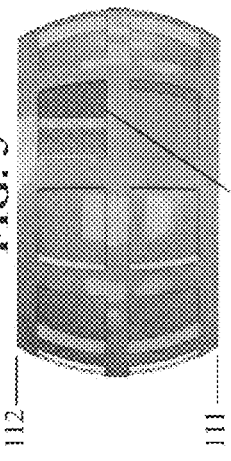
FIG. 5 is a front view of the housing shown in the exploded view of FIG. 4.
Figure 7:
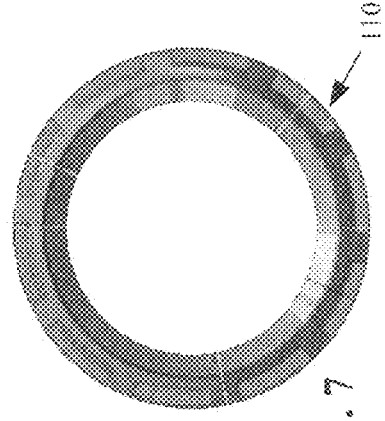
FIG. 7 is a bottom view of the housing of FIG. 5.
Figure 8:
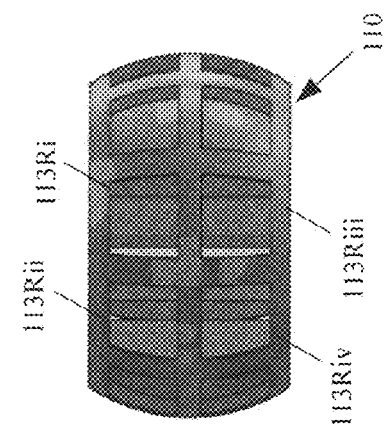
FIG. 8 is a side view of the housing of FIG. 5.
Figure 29:
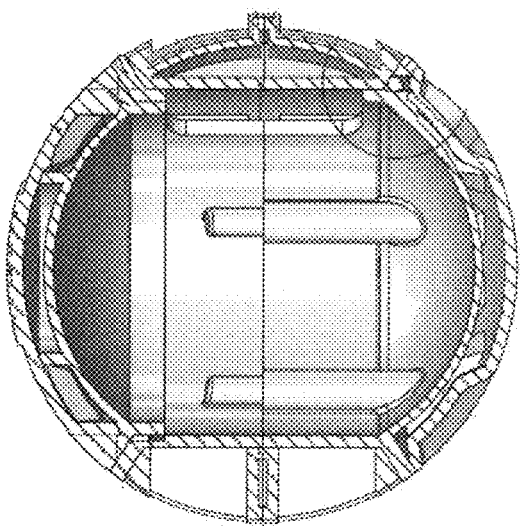
FIG. 29 is a second cross-sectional view through the spherical pet feeder embodiment shown in FIG. 1.
Figure 30A:
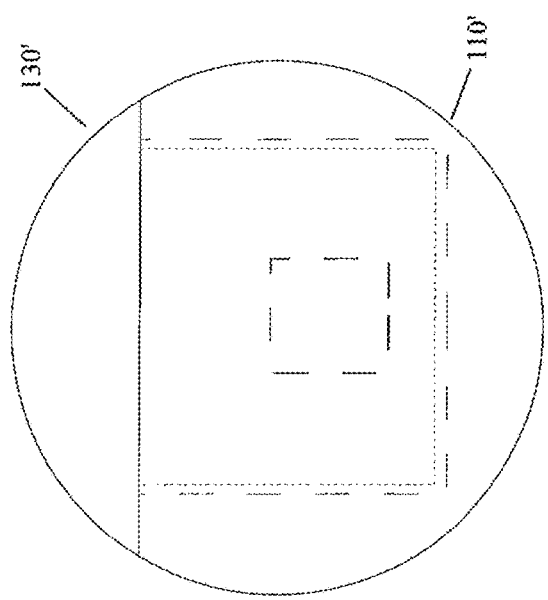
FIG. 30A is a cross-sectional view through a housing and cap member of a second spherical pet feeder embodiment.
Figure 31:
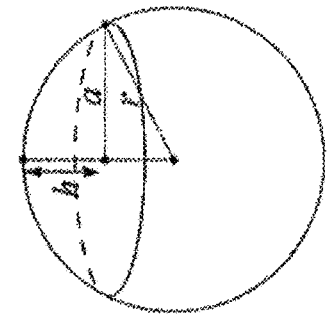
FIG. 31 illustrates the known mathematical definition for a spherical cap.

A first version of the housing is shown in FIGS. 5-6, being housing 110, and a second version of the housing is shown in FIG. 30A, being housing 110'. As seen in FIG. 6, a portion of housing 110 (and also housing 100') may be formed to have a substantially spherical exterior surface 110E (110E') with a radius R, and each may be hollowed out to create a cavity, which cavity may be formed by a cylindrical interior surface 110I. Other interior surfaces may be used, e.g., spherical, hour-glass shaped, etc. The housing 110 may extend from a first plane 111 to a second plane 112, and thus the outer surface may be a spherical frustum, being formed of a sphere from which a first polar spherical cap and a second polar spherical cap are removed (which second spherical cap may be directly opposite and the same size as the first spherical cap). Note that a spherical cap is defined as the region of a sphere that lies above a plane (see FIG. 31, where the sphere has a radius R, a spherical cap of height Is, and a base radius a). When the plane is at the center of the sphere, the spherical cap thereby formed is a hemisphere. As seen in FIG. 29, the housing 110' may be formed to only have one spherical cap removed, and may itself be a spherical cap.

For the housing 110 (and also housing 100') the removal of a spherical cap from the spherical housing may result in a boundary surface at the end of the spherical portion of the outer surface of the housing that may be a planar surface, or which may be any contoured shape, as an access opening 113A that defines a conduit into the cavity may be formed thereat (FIG. 6). For both the housing 110 and housing 110', the access opening 113A, which may be located where the spherical cap was removed from the housing, may be a particularly formed opening that may define a conduit that interconnects to the interior cavity of the housing.

Figure 20F:
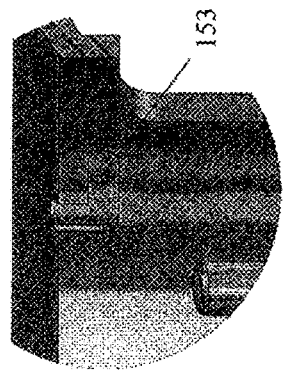
FIG. 20F is an enlarged detail view of the lid lock recess shown in FIG. 20.
Figure 20B:
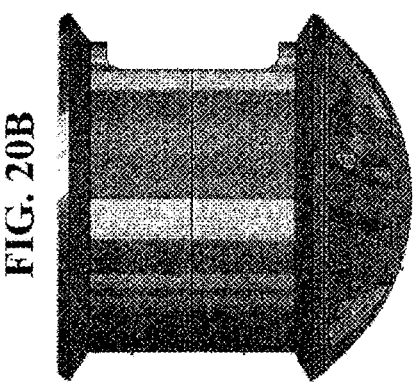
FIG. 20B is a side view of the assembled food chamber shown in FIG. 20A.
Figure 20E:
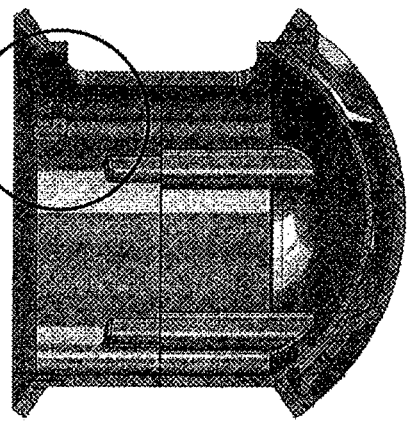
FIG. 20E is a cross-sectional view showing the first portion of the food chamber joined to the second portion of the food chamber, and showing the bosses with holes that may receive fasteners for mating the two parts together.
Figure 20C:
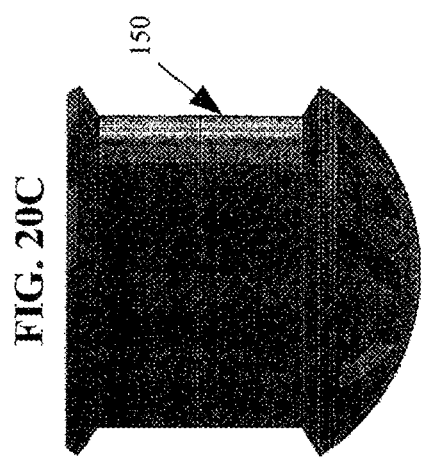
FIG. 20C is a rear view of the assembled food chamber shown in FIG. 20A.

The cap member 130 shown in FIGS. 21-24 (and also the cap member 130' shown in FIGS. 30A and 30B) may be sized and shaped to replace at least a portion of the spherical cap removed from the housing, and may be releasably securable to the housing (or another portion of the device) to cover the access opening when secured thereto (i.e., using one or more protrusions 133 that may each engage with a corresponding recess in the housing or a recess 153 in the treat holder 153—see FIGS. 20E-20F). The recess 153, as seen in FIG. 20F, may be "L" shaped so that the cap member 130 will need to be turned and/or be depressed slightly to securely fasten it to the treat holder 150 (or to the housing 110 for the embodiment shown in FIG. 30B).

To permit dispensing of treats from the treat holder 150, the housing may also have an opening 113P formed in a first region of the spherical frustum/cap (FIG. 5) that that defines a conduit that extends to a radial depth to interconnect with the housing cavity. The surface area (and shape of the periphery) of the opening 113P used on the spherical surface determines the size of the pet treat that may be dispensed through the conduit and out the opening. The shape of the periphery used for the opening 113P may be circular, or may be square, or may be close to a square, being generally trapezoidal.

Figure 28:
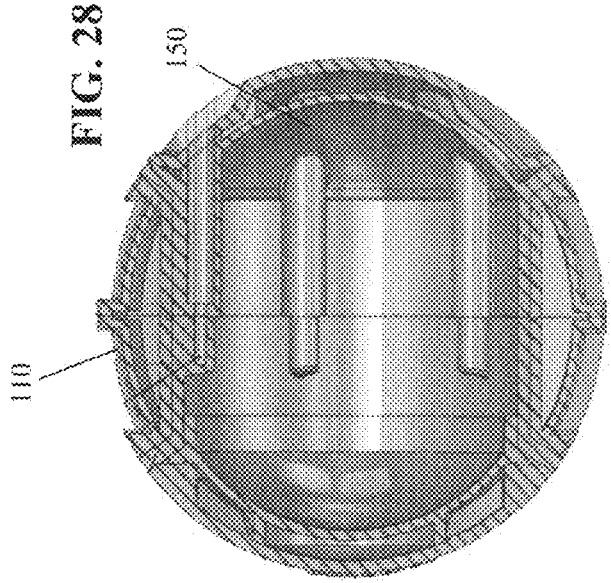
FIG. 28 is a first cross-sectional view through the spherical pet feeder embodiment shown in FIG. 1.
Figure 27:
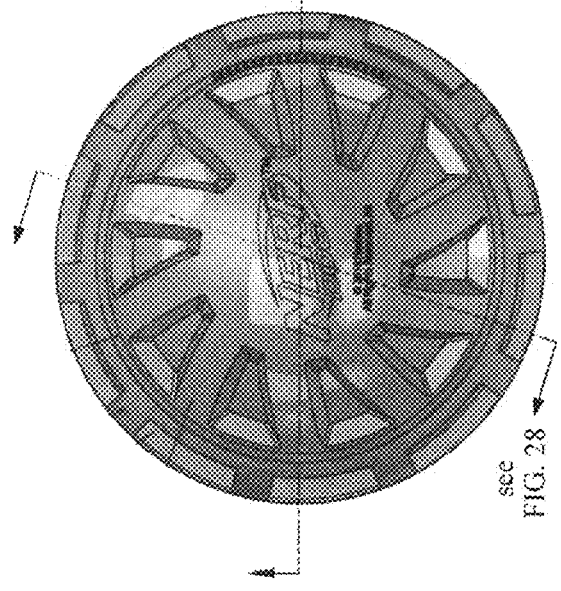
FIG. 27 is a top view of the spherical pet feeder embodiment shown in FIG. 1.
Figure 30B:
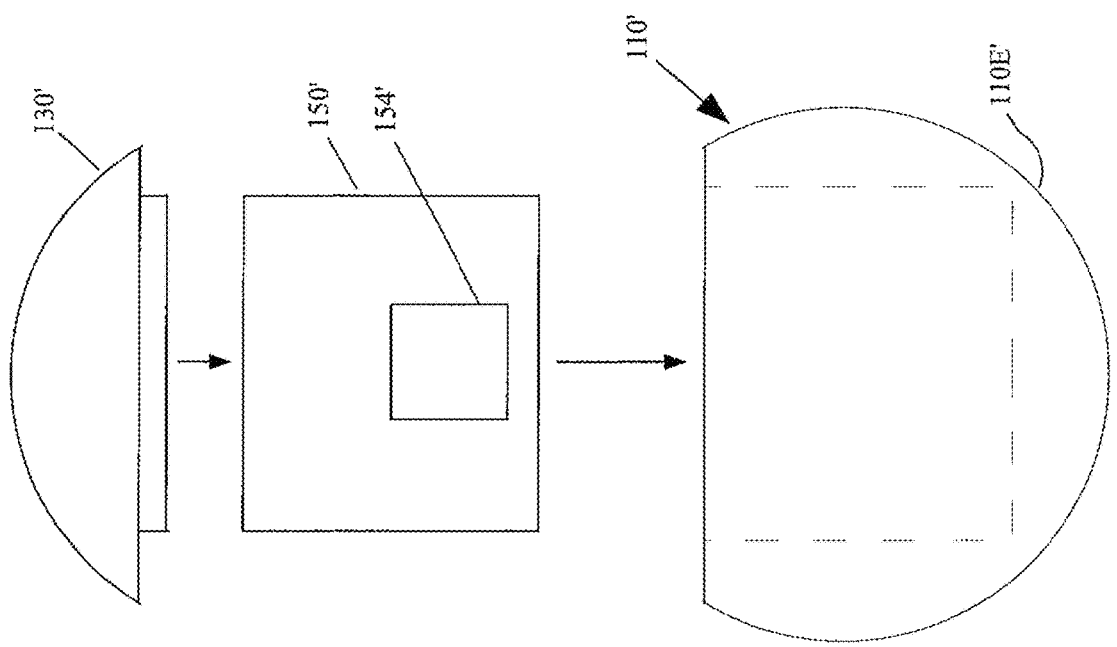
FIG. 30B is an exploded view of the housing and cap member of FIG. 30A.

The treat holder 150 may be particularly configured to store pet treats, and to dispense the pet treats through its co-action with the housing 110. The treat holder 150 as shown in FIGS. 20A-20F may be formed of two pieces 150A and 150B (see FIGS. 12-19), and may each be inserted into the housing 110, and may then be secured to each other (see FIG. 28). The treat holder 150' may be formed of a single part, as shown in FIG. 30B. The treat holder 150 shown in FIG. 20 (and also the treat holder 150' shown in FIG. 30B) may each be sized and shaped to be rotatably received within the cavity of the housing 110. Thus, in an embodiment where the interior surface defining the housing cavity is formed to be spherical, at least a portion of the exterior surface of treat holder may be spherical (in which case the housing may be formed of two parts that can be joined together); and in an embodiment where the interior surface defining the housing cavity is formed to be cylindrical, the exterior surface of the treat holder 150/150' may be generally cylindrical in shape, as may be seen in the figures. Each embodiment of the treat holder 150 may have a dispensing opening into the hollow cavity therein (e.g., dispensing opening 154 in FIG. 20A and dispensing opening 154' in FIG. 30B).

In one embodiment the dispensing opening 154 (154') may be formed to be substantially the same size and shape as the corresponding opening formed on the interior surface of the housing 110/110' by the conduit defined by opening 113P (which may be the projection of the periphery of the opening on the outer spherical surface onto the interior surface). In other embodiments, the dispensing opening 154/154' may be formed to be larger than the corresponding opening formed on the interior surface of the housing 110/110' by the conduit defined by opening 113P.

Therefore, it may be understood that the treat holder 150 may be rotated within the housing 110/110' at least between: a first position where the dispensing opening 154/154' is substantially aligned with and interconnected to the opening 113P in the housing 110/110' to permit dispensing of the treats from the pet feeder 100; and a second position where the dispensing opening 154/154' is not aligned with the opening 113P in the housing 110/110', to prevent the dispensing of treats from the treat holder. Such misalignment of the dispensing opening with the housing opening may be complete (i.e., absolutely no portion of the dispensing opening 154/154' may be aligned with the opening 113P in the housing 110/110'), or there may be a minimal amount of overlap between those openings, but which may be too small to permit a particularly sized per treat to egress through the common open area.

To challenge the pet and provide a puzzle for the pet to solve, in terms of learning about the surface features of the pet feeder 100 and understanding how to cause pet treats to be dispensed (an possibly at a more rapid rate), if at all, the spherical exterior surface may also include a plurality of additional openings each defining a corresponding plurality of recesses, to form a spherical housing lattice. The additional openings and recesses may be distributed substantially regularly on at least a portion of the exterior surface about the opening 113P, and may be formed to have a substantially similar shape, as discussed hereinafter. The additional openings and the corresponding plurality of recesses may be formed to a lesser radial depth than the conduits of the opening 113P, so as to not interconnect with the housing cavity. (Note that as used herein, the expression radial depth refers to a radial distance being a distance from the outmost surface of the sphere toward the feature along a line drawn perpendicular from the outer surface to the center of the sphere). The additional openings and the corresponding plurality of recesses create a puzzle for the pet to solve, as they may be visually recognizable as being formed to a lesser radial depth, and thus provide a clue to the pet who may learn that rolling the pet feeder 100 so only along these openings touch the ground releases little if any treats (i.e., rolling it such that the opening 113P is substantially stationary with it rotating about an axis of rotation the similar to the hub of a car tire rim rotating about an axle). To further the visual clue provided by the pet feeder 100 that only the opening 113P being rolled into contact with the ground will maximize dispensing of treats, the additional openings may be formed to have a different shape. Alternatively or additionally, the housing outer surface and/or the corresponding plurality of recesses defined by those additional openings may be formed with a different color or color shade than the treat chamber, and/or the cavity of the housing. The conduits formed by the opening 113P into the housing cavity may be the same color as the housing exterior, making discerning the conduits more difficult, or may be the same color/shade as the treat chamber and cavity, making discerning the conduits a little easier.

For example, in one embodiment, as seen in FIG. 1, the exterior of the housing may be formed to be a first color, e.g., light gray, light yellow, light orange etc., while the conduits of the housing 110 and the interior of the treat chamber 150 may be colored a second color, e.g., dark gray, dark yellow, dark orange, etc. (see, FIGS. 1-3 and FIGS. 5-9).

In one embodiment, the housing 110 of pet feeder 100 may have two openings defining recesses being formed side-by-side in the axial direction (see FIG. 1), and may have a plurality of such pairs of openings (e.g. 10 pairs) formed in the circumferential direction, creating a total of two times the number of openings in the circumferential direction (e.g., 2×10), being a total of 20 openings, which in one embodiment may be for a pet feeder with a spherical housing diameter of about 5.0 inches. Thus, in this embodiment, the opening 113P that permits dispensing of pet treats through the corresponding conduit interconnected with the dispensing opening 154 of the treat holder 150 may be positioned adjacent to a recess that does not permit dispensing, both of which may be positioned between the planes 111 and 112 of the housing 110 (FIG. 5). In another embodiment, the housing 110 of pet feeder 100 may have three openings formed side-by-side in the axial direction, i.e., between planes 111 and 112 of the housing 110 (not shown), and the opening 113P that permits dispensing of pet treats through the corresponding conduit interconnected with the dispensing opening 154 of the treat holder 150 may be positioned adjacent to and between two shallow depth recesses that do not permit dispensing, or one of the other recesses.

Figure 5A:
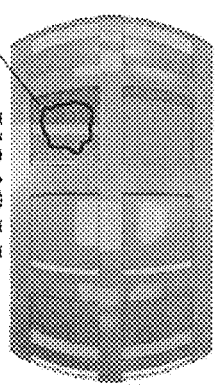
FIG. 5A is the front view of FIG. 5, but showing the opening being sized to permit passing therethrough of only one pet treat of a particular size.
Figure 9:
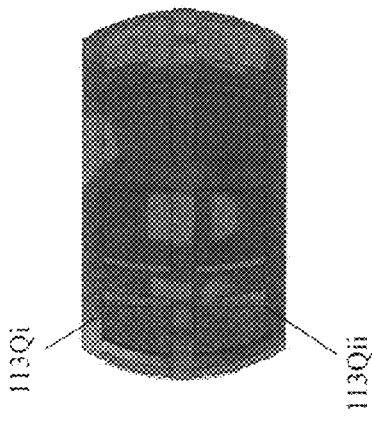
FIG. 9 is a rear view of the housing of FIG. 5.
Figure 11:
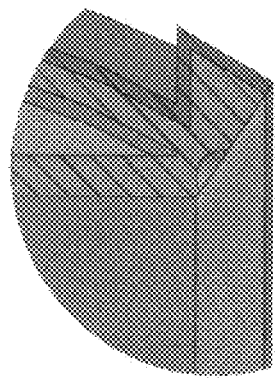
FIG. 11 is an enlarged detail view of one corner of the cross-section shown in FIG. 10.
Figure 10:
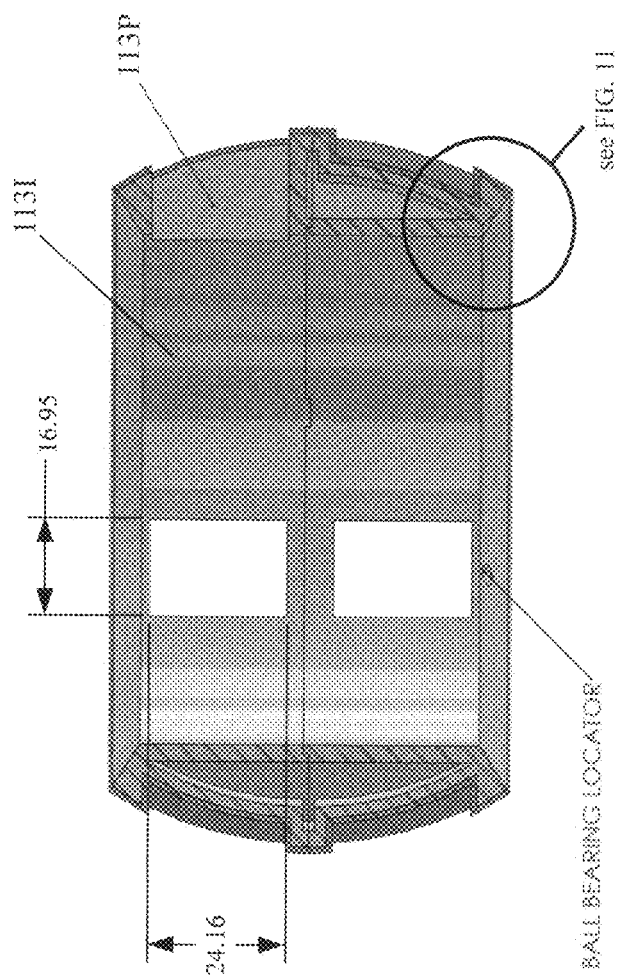
FIG. 10 is a cross-sectional view taken through one of the opening shown in FIG. 7A.
Figure 19:
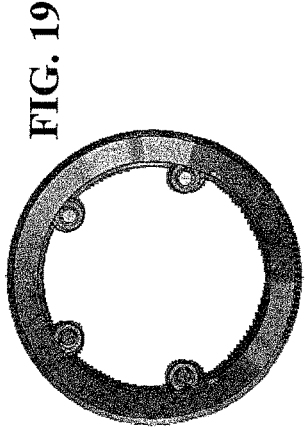
FIG. 19 is a top view of the first portion of the food chamber shown in FIG. 12.
Figure 16:
FIG. 16 is a front view of the second portion of the food chamber shown in the exploded view of FIG. 4.
Figure 17:
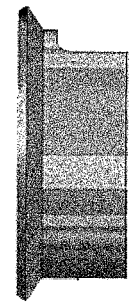
FIG. 17 is a side view of the second portion of the food chamber shown in FIG. 12.
Figure 18:
FIG. 18 is a rear view of the first portion of the food chamber shown in FIG. 12.
Figure 12:
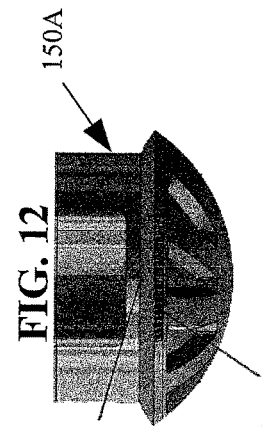
FIG. 12 is a front view of the first portion of the food chamber shown in the exploded view of FIG. 4.
Figure 13:
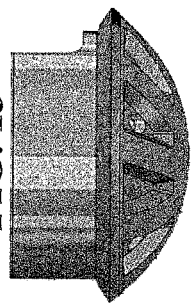
FIG. 13 is a side view of the first portion of the food chamber shown in FIG. 12.
Figure 14:
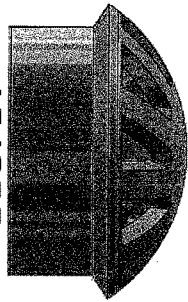
FIG. 14 is a rear view of the first portion of the food chamber shown in FIG. 12.
Figure 15:
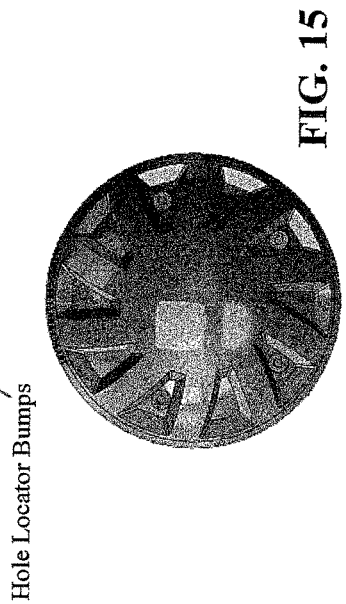
FIG. 15 is a bottom view of the first portion of the food chamber shown in FIG. 12.

In each such embodiment, the size (i.e., the diameter) of the spherical exterior surface of the pet feeder 100 may be sufficient for the treat holder 150 to store a desirable number of pet treats so that it need not have to be refilled very often depending upon the extent of its use by the pet (i.e., in one embodiment it may hold between 5-20 pet treats, and in another embodiment it may hold between 20-40 pet treats, and in yet another embodiment it may hold between 40-100 pet treats, and in other embodiments other storage size ranges may be used, including a combination of those noted storage size ranges). In addition, the size of the opening 113P of the pet feeder 100 may be calibrated in one embodiment to permit dispensing of only one pet treat 99 through the corresponding conduit at a time (see FIG. 5A), and in other embodiments, the size of the opening 113P may be calibrated to permit two or more such pet treats to be simultaneously dispensed. In another embodiment, the size of the opening 113P of the pet feeder 100 and the recesses may be proportional to the overall size (diameter) of the spherical lattice.

Figure 21:
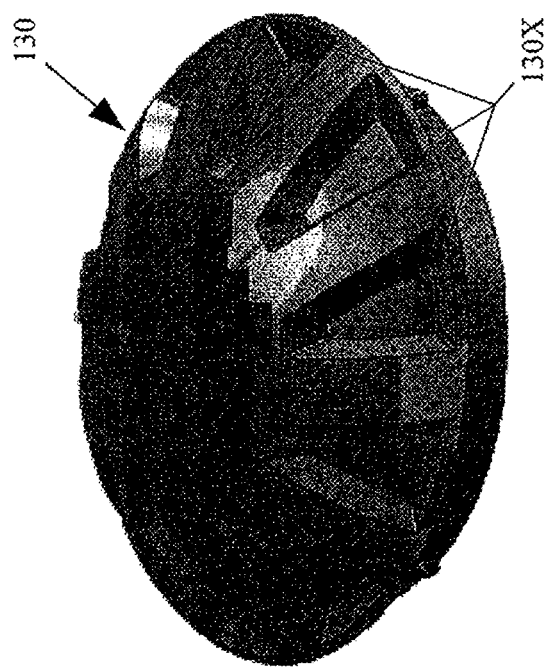
FIG. 21 is a first perspective view of an optional lid that is shown in the exploded view of FIG. 4.
Figure 25:
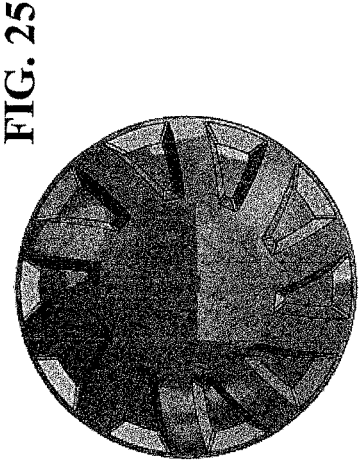
FIG. 25 is a top view of the lid shown FIG. 21.
Figure 23:
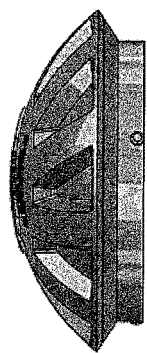
FIG. 23 is a front view of the lid shown FIG. 21.
Figure 24:
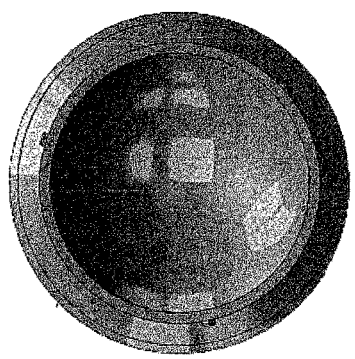
FIG. 24 is a bottom view of the lid shown FIG. 21.
Figure 26:
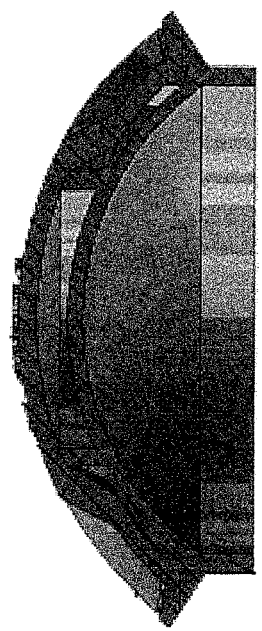
FIG. 26 is a cross-sectional view of the lid shown FIG. 21.

Also, in one embodiment, the cap member 130 may also have a plurality of openings 130X that define shallow depth recesses that do not interconnect with the housing cavity, and further contribute to the puzzle aspect of the device. These openings 130X on the cap member 130 may be shaped similar to the opening 113P and the additional opening with corresponding recesses formed on the housing, or alternatively may be more elongated, as shown in FIG. 21. Similarly, the spherical exterior portion of the treat holder 150 (see FIG. 20A) may also have such shallow depth recesses that do not interconnect with the cavity of the hollow treat holder to add to the puzzle for the pet.

Note that the spherical cap portion of the housing 100' (see FIG. 30B) may similarly be formed with shallow depth recesses. In one embodiment the cap member 130 and the spherical cap portion of the housing 110 (also the spherical cap portion of the housing 100') may each be colored a third color (e.g., silver) to distinguish the color of the housing, and the pet feeder 100 may resemble a wheel (i.e., as seen in FIG. 3, the silver cap member 130 and the silver spherical cap portion of the housing 100' may look like a rim and the orange portion may resemble a tire). The color scheme with the silver non-dispensing sides and the orange central portion may provide another visual clue to the pet as to how to orient the pet feeder 100 with respect to rolling on the ground to permit dispensing of treats and/or even to maximize dispensing of treats.

In another embodiment, the pet feeder 100 may also be formed to have a larger opening and corresponding conduit similar to the conduit defined by opening 113P, being positioned at a different clocking than opening 113P (e.g., 120 degrees apart, or 180 degrees apart), and which may interconnect to the dispensing opening 154/154' of the treat holder 150 when rotated thereto, to provide for dispensing of two or more pet treats at a time (i.e., to provide dispensing at a second dispensing rate being different than the first dispensing rate provided by the conduit defined by opening 113P).

In one embodiment, to ensure smooth rolling of the pet feeder 100 along with the dispensing at the second (higher) rate, the larger overall opening and corresponding conduit may be provided by forming two openings 113Qi and 113Qii in the housing 110 (see FIG. 9) each of which may be roughly the same size as each other and the same size as opening 113P. The two openings 113Qi and 113Qii with corresponding conduits may be two of the plurality of openings 130X that in the other embodiment defined shallow depth recesses, but which are extended in this embodiment to instead interconnect with the housing cavity.

The two openings 113Qi and 113Qii with corresponding conduits that interconnect with the cavity of the housing 110 accommodate dispensing of pet treats at the second rate when the treat holder 150 is rotated within the housing 110/110' to a third position at which those conduits are aligned with the dispensing opening 154/154' of the treat holder. Thus, in this embodiment the dispensing opening 154/154' of the treat holder is preferably sized to be at least as large as the area provided by the openings 113Qi and 113Qii and the space therebetween.

In yet another embodiment, the pet feeder 100 may also be formed to have an even larger opening and corresponding conduit similar to the conduits defined by openings 113Qi/113Qii, being positioned at a different clocking than opening 113P and the openings 113Qi/113Qii (e.g., each spaced 120 degrees apart—see FIG. 7A), and which may interconnect to the dispensing opening 154/154' of the treat holder 150 when rotated thereto, to provide for dispensing of at least three or more pet treats at a time (i.e., to provide dispensing at a third dispensing rate being greater than the second dispensing rate provided by the conduits defined by openings 113Qi/113Qii).

In one embodiment, to again ensure smooth rolling of the pet feeder 100 along with the dispensing at the third rate, this even larger overall opening and corresponding conduit may be provided by forming four openings 113Ri, 113Rii, 113Riii, 113Riv in the housing 110 (see FIG. 8) each of which may be roughly the same size as each other and the same size as opening 113P. These four openings 113Ri, 113Rii, 113Riii, 113Riv with corresponding conduits may be four of the plurality of openings 130X that in the other embodiment defined shallow depth recesses, but which are again extended in this embodiment to instead interconnect with the housing cavity.

The four openings 113Ri, 113Rii, 113Riii, 113Riv with corresponding conduits that interconnect with the cavity of the housing 110 accommodate dispensing of pet treats at the third rate when the treat holder 150 is rotated within the housing 110/110' to a fourth position at which those conduits are aligned with the dispensing opening 154/154' of the treat holder. Thus, in this embodiment the dispensing opening 154/154' of the treat holder is preferably sized to be at least as large as the area provided by the openings 113Ri, 113Rii, 113Riii, 113Riv and the space therebetween. It is noted that rather than having one large rectangular-shaped dispensing opening 154/154' being formed in the treat holder, four correspondingly sized openings may instead be used, which four openings would align properly with the housing openings 113Ri, 113Rii, 113Riii, 113Riv when rotated into the fourth position, and the other positions as well.

Figure 29A:
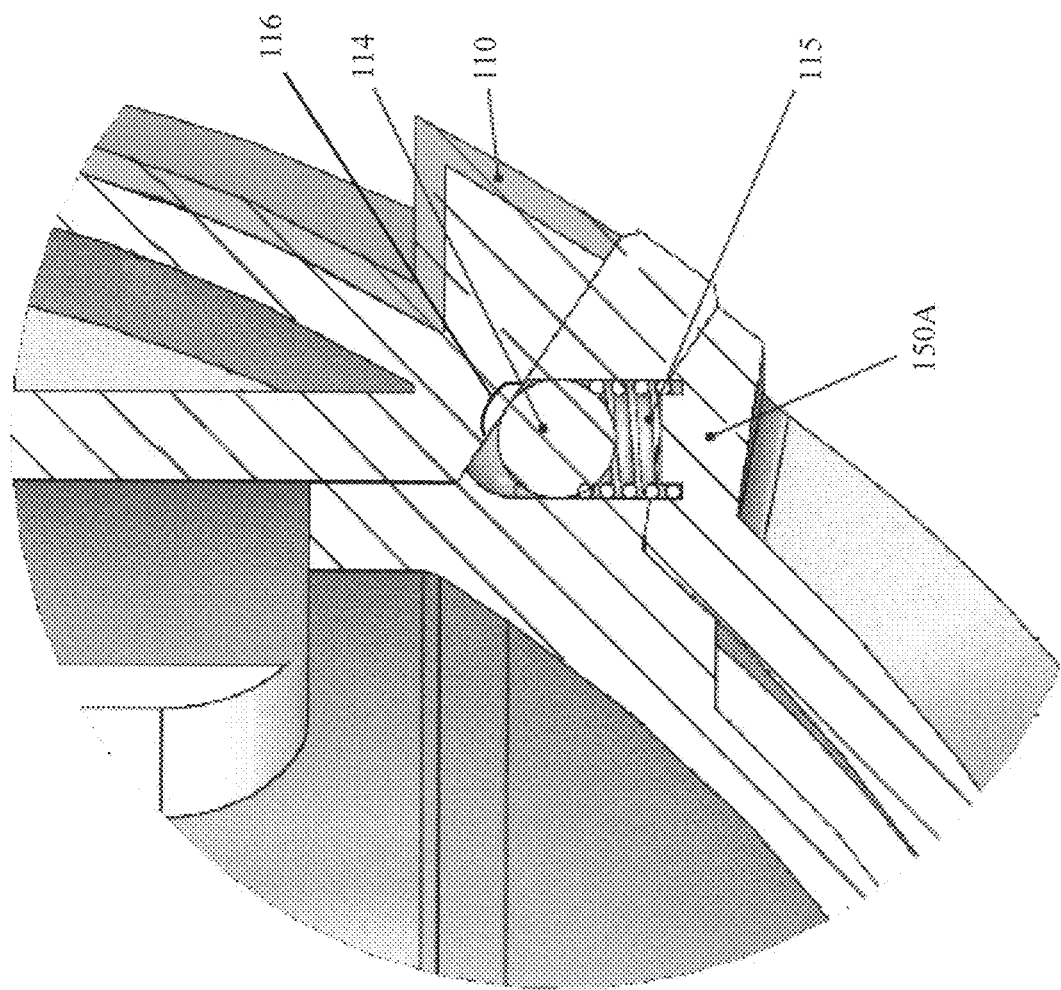
FIG. 29A is an enlarged detail view of the cross-sectional view of FIG. 29, showing the spring biasing the ball to form a detent with respect to a recess in the housing.

To assist the user in rotating the treat holder 150 to each of the noted positions, serrations 150S may be provided either on the treat holder itself (see FIG. 20A), or on the cap member 130 (not shown). Also, to provide a tactile indication to the user as to when the treat holder 150 reaches one of those positions, and to releasably retain the treat holder threat, a detent mechanism may be used. Various different detent mechanism known in the art may be used. Merely to be exemplary, an arrangement is shown in FIG. 29A, the parts for which (see FIG. 4A) include a ball 114 that may be biased by a spring 115, a portion of which ball may seat within a small spherical recess 116 formed at each of the four positions.

In one embodiment of the housing 110, as described hereinabove, each of the openings that define the recesses and the conduits may be any desired shape. However, in another embodiment a spherical housing lattice that permits substantially smooth rolling of the pet feeder 100 may be formed by the pattern of openings in the spherical outer surface of the housing such that each opening that defines either a recess or a conduit is substantially square-shaped throughout the entire surface area of the sphere (see e.g., Katherine Liapi, "Square Tessellation Patterns on Curved Surfaces: In Search of A Parametric Design Method," Parametric and Generative Design, vol. 2, eCADDe, 35|371). In yet another embodiment, the housing lattice may be formed by the pattern of openings in the spherical outer surface of the housing such that each opening that defines either a recess or a conduit is substantially trapezoidal shaped. The trapezoidal shape may be defined by latitude planes (e.g., planes 111 and 112) and meridian planes. For example, the trapezoidal-shaped opening 113P and trapezoidal-shaped plurality of openings 130X along the same row may be formed between a first latitude plane and a second latitude plane (which may be offset respectively from plane 111 and the equatorial plane), and between a first meridian plane and a second meridian plane for opening 113P, and between a plurality of other meridian planes for the openings 130X (e.g., a first meridian plane, a second meridian plane, a third meridian plane, a fourth meridian plane, and a fifth meridian plane for the ten openings shown on that row—note that with equal spacing the sixth through tenth meridian planes would be the same as the first through fifth meridian planes). The bottom row of openings may be similarly formed between those meridian planes, but being between the equatorial plane and the plane 112.

Each of the plurality of recesses in the spherical outer surface of the housing 110/110' formed between those planes are configured to subtended a relatively small angle to enable substantially undisturbed rolling of said spherical housing lattice, which angle in one embodiment may be between 8 to 12 degrees, and in another embodiment may be between 12-20 degrees, and in yet another embodiment may be between 20 to 28 degrees. Other angle ranges may be used in other embodiments, including any combination of those subtended angle ranges. The opening size provided by the subtended angle will be sufficient to permit dispensing of the particular size pet treat desired for the pet.

While illustrative implementations of one or more embodiments of the disclosed apparatus are provided hereinabove, those skilled in the art and having the benefit of the present disclosure will appreciate that further embodiments may be implemented with various changes within the scope of the disclosed apparatus. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A puzzle pet feeder comprising:
a housing comprising:
    a spherical cap comprising a spherical outer surface that terminates on a boundary surface;
    a spherical lattice formed by a pattern of openings formed in said spherical outer surface of said spherical cap that define a plurality of recesses, with each said recess formed to extend to a first radial depth;
    an interior surface formed within a portion of said housing defining a cavity, said cavity being formed beneath a second radial depth, said second radial depth being greater than said first radial depth;

an access opening in said boundary surface of said spherical cap of said housing defining a conduit into said cavity;

a first opening of said plurality of openings being formed in a first region of said spherical housing lattice and comprising a first surface area that forms a conduit that extends to interconnect with said cavity;

a second and a third opening of said plurality of openings being formed in a second region of said spherical housing lattice and comprising a respective second surface area and third surface area that each form corresponding conduits that extend to interconnect with said cavity, said second surface area and said third surface area in combination being greater than said first surface area;

a fourth, fifth, sixth, and seventh opening of said plurality of openings being formed in a third region of said spherical housing lattice and comprising a respective fourth surface area, fifth surface area, sixth surface area, and seventh surface area that each form corresponding conduits that extend to interconnect with said cavity, said fourth, fifth, sixth, and seventh surface areas in combination being greater than said second and third surface areas combined; and a treat chamber configured to store pet treats, said treat chamber comprising: a dispensing opening for the dispensing of the pet treats stored therein; wherein at least a portion of said treat chamber is rotatably received within said cavity of said housing a removable cover member configured to cover said access opening into the housing cavity, an outer surface of said removable cover member comprising a spherical cap; said spherical cap of said removable cover member and said spherical cap of said housing forming a substantially full spherical shape; and wherein said treat chamber is rotatable between:
  a first position where said dispensing opening is substantially aligned with said first opening to permit dispensing of the pet treats at a first rate;
  a second position where said dispensing opening is substantially aligned with said second and third openings, to permit dispensing of the pet treats at a second rate, said second rate being greater than said first rate;
  a third position where said dispensing opening is substantially aligned with said fourth, fifth, sixth, and seventh openings, to permit dispensing of the pet treats at a third rate, said third rate being greater than said second rate; and
  a fourth position where said dispensing opening is not aligned with any of said first, second, third, fourth, fifth, sixth, and seventh openings, to prevent the dispensing of treats.

2. The puzzle pet feeder according to claim 1, further comprising a detent mechanism configured to releasably inhibit said rotation of said treat chamber with respect to said housing when said dispensing opening is aligned with said conduits in said first region, and when aligned with said conduits in said second region, and when aligned with said conduits in said third region.

3. The puzzle pet feeder according to claim 2, wherein said spherical outer surface of said housing terminates on a planar said boundary surface to form said spherical cap.

4. The puzzle pet feeder according to claim 3,
  wherein said cover member comprises a plurality of openings in its spherical outer surface defining recesses formed to extend to a radial depth being no greater than said first radial depth;
  wherein said spherical outer surface of said housing terminates on a second boundary surface to form a spherical frustum;
  wherein said treat chamber comprises a spherical cap formed with a plurality of openings in a spherical outer surface defining recesses formed to extend to a radial depth being no greater than said first radial depth; and
  wherein said spherical cap of said cover member, said spherical frustum of said housing, and said spherical cap of said treat chamber together form a substantially spherical surface.

5. The puzzle pet feeder according to claim 4, wherein said first surface area, said second surface, said third surface area, said fourth surface area, said fifth surface area, said sixth surface area, and said seventh surface area are substantially equal.

6. The puzzle pet feeder according to claim 5, wherein said first region, said second region, and said third region are spaced apart about 120 degrees on said spherical outer surface.

7. The puzzle pet feeder according to claim 6, wherein said pattern of openings in said spherical frustum each comprise a plurality of equally spaced pairs of openings, each pair comprising a symmetrical trapezoidal shaped periphery.

8. The puzzle pet feeder according to claim 7,
  wherein said outer surface of said spherical frustum of said housing comprises a first color;
  wherein an interior surface of said treat chamber comprise a second color; and
  wherein said second color is distinguishable from said first color to identify said openings configured to permit dispensing of the treats from said pet feeder.

* * * * *